United States Patent [19]
Mitton

[11] 3,707,845
[45] Jan. 2, 1973

[54] DUAL MASTER CYLINDER ASSEMBLY

[75] Inventor: Robert E. Mitton, San Diego, Calif.

[73] Assignees: Hal C. Johnson, Chula Vista; Shirley M. Jones, San Diego; Marie Jones; Eric D. Ross, National City, Calif. ; part interest to each

[22] Filed: Jan. 27, 1971

[21] Appl. No.: 110,022

[52] U.S. Cl. ............... 60/54.6 R, 74/110, 188/345, 60/546 E
[51] Int. Cl. ..................... F15b 7/00, B60t 1/00
[58] Field of Search .......... 60/54.6 E, 54.5 E, 54.6 R; 74/110; 188/345

[56] References Cited

UNITED STATES PATENTS

| | | | |
|---|---|---|---|
| 2,283,961 | 5/1942 | Williamson | 60/54.6 R |
| 1,682,425 | 8/1928 | Schmidt | 60/54.6 R |
| 3,362,506 | 1/1968 | Mossey | 74/110 |
| 3,511,103 | 5/1970 | Cox | 74/110 |
| 3,385,120 | 5/1968 | Nott | 74/104 |
| 2,422,353 | 6/1947 | Hitt | 308/6 B |
| 3,434,286 | 3/1969 | Raizes | 60/54.5 E |
| 3,172,265 | 3/1965 | Randol | 60/54.6 E |
| 3,434,359 | 3/1969 | Williams et al. | 74/110 |
| 3,535,944 | 10/1970 | Newstead | 74/110 |
| 1,457,156 | 5/1923 | Frock | 60/54.6 R |
| 1,751,646 | 3/1930 | Nieman | 74/110 |

*Primary Examiner*—Edgar W. Geoghegan
*Assistant Examiner*—A. M. Zupcic
*Attorney*—Lyon & Lyon

[57] ABSTRACT

A dual master cylinder assembly for separately operating two hydraulic brake systems for a wheeled vehicle, employs two oppositely moving pistons in coaxial bores. An actuator extending transversely between the pistons carries toggle mechanism comprising a pair of links, one connected to each of the pistons, respectively. A roller at the pivotal connection between each link and its respective piston rolls on the bore surface to eliminate side loading and insure that only axial forces are applied to the pistons. As the toggle links straighten out the axial force on the pistons is multiplied.

6 Claims, 5 Drawing Figures

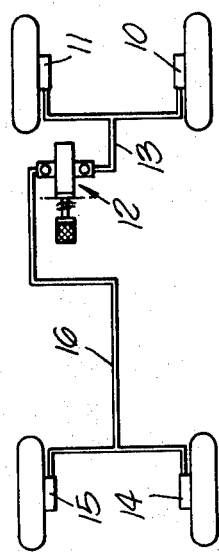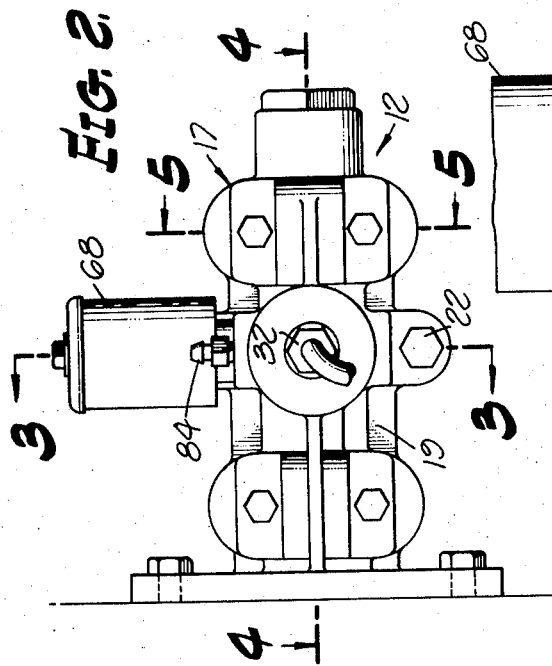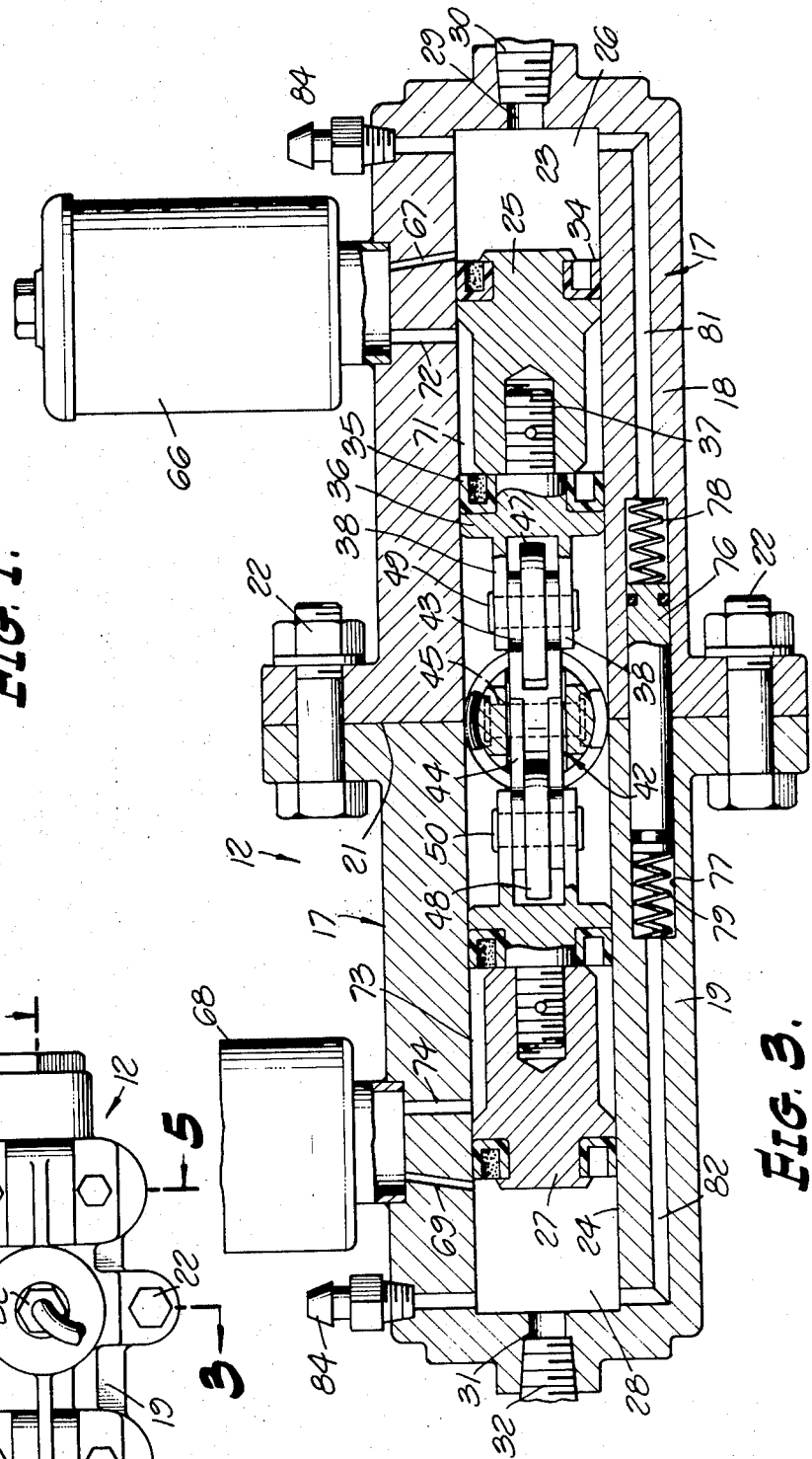

DUAL MASTER CYLINDER ASSEMBLY

This invention relates to hydraulic brake systems for vehicles and is particularly directed to improvements in the master cylinder assembly so that pairs of wheel-cylinder assemblies may be separately actuated. For example, the front wheel brakes of a vehicle are separately actuated with respect to the rear wheel brakes of the vehicle, although both sets of brakes are applied and released substantially simultaneously. An advantage of this type of brake system is that failure of one pair of brakes caused by breakage of a hydraulic line, for example, does not impair operation of the other pair of brakes. This is an important safety feature.

In accordance with this invention, two oppositely moving pistons are mounted in axially aligned bores in the master cylinder housing, and a toggle mechanism is interposed between a transversely moving actuator and each of the pistons. In this way, mechanical movement of the actuator under force transmitted from the brake pedal causes the pistons to move equally in opposite directions. Any failure in the hydraulic system pressurized by either one of the pistons does not adversely affect the operation of the other piston in pressurizing its hydraulic system. Thrust rollers are provided which roll in the same bores as the pistons, respectively, so that side loading is eliminated and only axial force is applied by the toggle links to the oppositely moving pistons.

Other and more detailed objects and advantages will appear hereinafter.

In the drawings:

FIG. 1 is a diagrammatic plan view of a four-wheeled vehicle having hydraulic brakes and showing a master cylinder assembly of this invention connected in the hydraulic brake system.

FIG. 2 is a side elevation showing a preferred form of master cylinder assembly embodying this invention.

FIG. 3 is an enlarged sectional view taken substantially on the lines 3—3 as shown in FIG. 2.

Figures 4, 5:
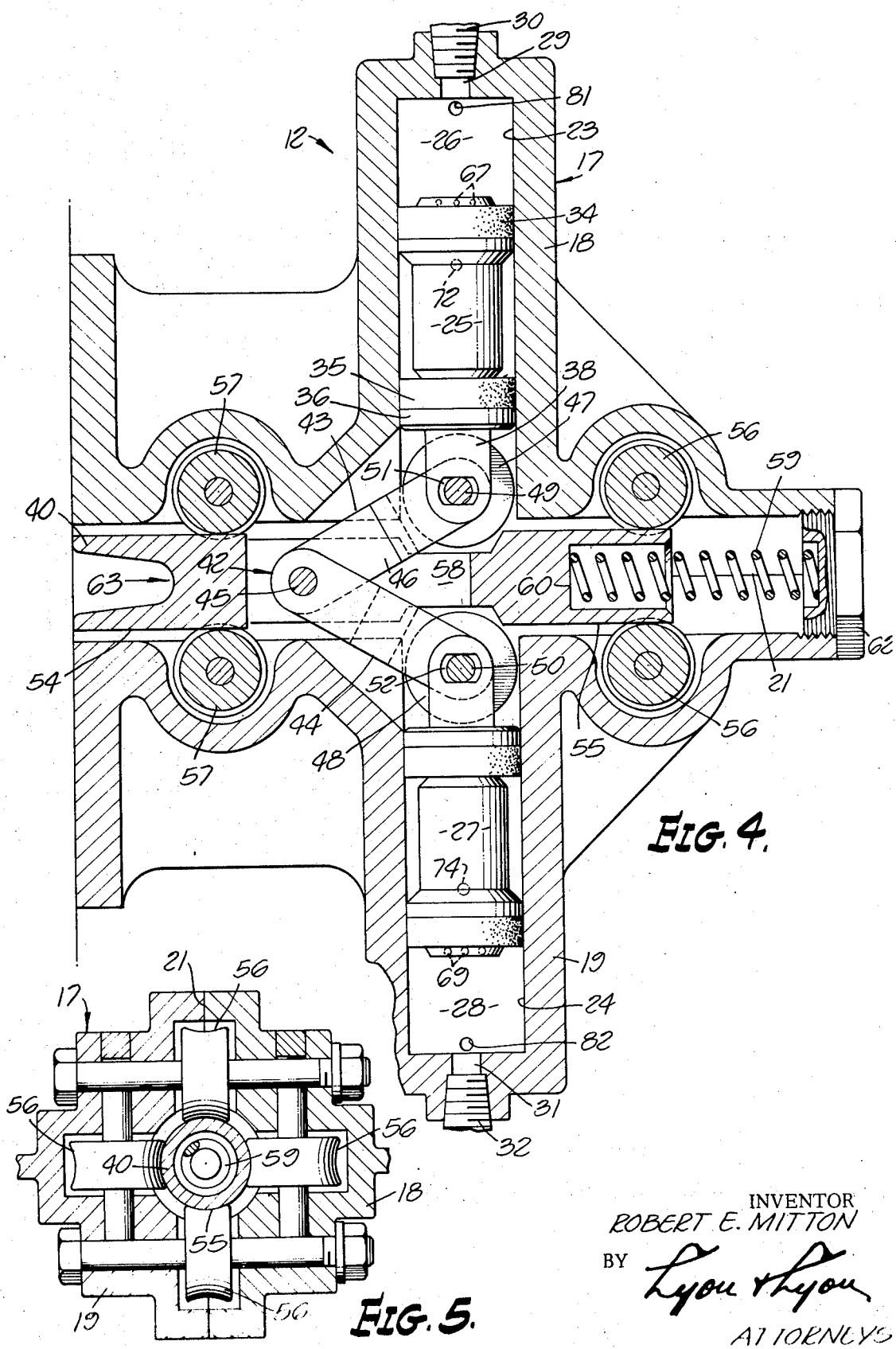
FIG. 4 is a transverse sectional view taken substantially on the lines 4—4 as shown in FIG. 2.
FIG. 5 is a sectional detail taken substantially on the lines 5—5 as shown in FIG. 2.

Referring to the drawings, the four-wheeled vehicle shown in FIG. 1 is provided with a first pair of wheel-cylinder assemblies 10 and 11 connected to the master cylinder assembly 12 through hydraulic lines 13. A second pair of wheel-cylinder assemblies 14 and 15 are connected through hydraulic lines 16 to the same master cylinder assembly 12. The master cylinder assembly generally designated 12 comprises a housing 17 formed of two separate duplicate sections 18 and 19 connected on a transverse joint 21 by means of threaded fastenings 22. Coaxial bores 23 and 24 are provided in the housing 17. A piston 25 is slidably mounted within the bore 23 and cooperates with the housing section 18 to form an expansible pressure chamber 26. Similarly, the piston 27 is slidably mounted within the bore 24 and cooperates with the housing section 19 to form an expansible pressure chamber 28. A port 29 in the wall of the housing section 18 is connected through fitting 30 to the hydraulic line 16 leading to the wheel cylinders 14 and 15. Similarly, port 31 in the housing section 19 is connected by fitting 32 to hydraulic lines 13 leading to the wheel-cylinder assemblies 10 and 11.

The pistons 25 and 27 are duplicates, and therefore a description of one will suffice for both. The piston 25 has a cup ring 34 at its forward end and has a similar cup ring 35 axially spaced therefrom. The piston portion 36 is connected by threads 37 to the remainder of the piston 25, and this portion 36 is bifurcated to form a pair of rearwardly extending ears 38.

An actuator generally designated 40 is mounted to move transversely of the housing 17 and a central portion of the actuator is positioned directly between the oppositely moving pistons 25 and 27. A toggle mechanism generally designated 42 includes a pair of equal-length links 43 and 44, each pivoted at one end to the pin 45 carried on the actuator 40. The link 44 is actually composed of two separate parallel parts which straddle the central portion 46 of the link 43. Thrust rollers 47 and 48 are each provided with oppositely extending trunnions 49, 50. The trunnions 49 are rotatably received in aligned bores provided in the link 43, and similarly, the trunnions 50 are rotatably received within aligned bores in the two parts of the link 44. The trunnions 49 and 50 also extend through slotted openings 51 and 52 provided in the bifurcated ears 38 of the pistons 25 and 27. The thrust rollers 47 and 48 have rounded crowns so that they may roll on the cylindrical surfaces of the aligned bores 23 and 24. The slotted openings 51 and 52 prevent side loads from being applied to the pistons, and this side loading applied through the toggle mechanism 42 is taken by the rollers 47 and 48.

The actuator 40 is provided with integral end portions which are externally cylindrical and in coaxial alignment. These cylindrical end portions 54 and 55 are received and guided by two sets of rollers 56 and 57 having peripheries shaped to fit the cylindrical surfaces 54 and 55. Each of the guide rollers 56 and 57 is mounted on a shaft carried by the housing 17.

The central portion of the actuator 40 between the cylindrical end portions 54 and 55 is slotted, as shown at 58, to receive the links 43 and 44, and to provide clearance for their operation. A coil compression spring 59 has one end engaging the shoulder 60 on the actuator and the other end engaging the plug 62 threadedly attached to the housing 17. The action of the spring 59 is to move the actuator to the left, as viewed in FIG. 4, and thereby cause the toggle mechanism 42 to retract the pistons 25 and 27 in their respective bores 23 and 24. When the brakes are to be actuated, a force is applied by a push rod (not shown) into the cavity 63 at the exposed end of the actuator 40. The actuator moves against the force of the spring 59 to spread the links 43 and 44 and apply equal force to the pistons 25 and 27 and to cause them to travel for the same distance in opposite directions. Side loading on the pistons is eliminated by the rolling action of the rollers 47 and 48 moving along the surfaces of the aligned bores 23 and 24.

Hydraulic fluid is supplied to the expansible chamber 26 from reservoir 66 and port 67. Similarly, hydraulic fluid is supplied to the expansible chamber 28 from reservoir 68 through port 69. The annular space 71 between the sealing cups 34 and 35 on piston 25 communicates with the interior of the reservoir 66 through port 72. Similarly, the annular space 73 between the sealing cups on the piston 27 is connected to the interior of the reservoir 68 through port 74. When the pistons 25 and 27 move away from each other from the retracted position shown in FIG. 3 to decrease the volume of the expansible chambers 26 and 28, respectively, the sealing cups 34 on the pistons pass the openings into the ports 67 and 69 and trap hydraulic fluid in the expansible chambers. Continuing movement of the pistons delivers hydraulic fluid through the lines 13 and 16 to operate the wheel cylinders at the four wheels of the vehicle. As the links 43 and 44 of the toggle mechanism straighten out the force advantage increases, so that moderate force applied to the actuator 40 is multiplied in its effect on the pistons 25 and 27, and corresponding increase in hydraulic pressure delivered to the wheel cylinders.

Means are provided for equalizing the pressures in the expansible chambers 26 and 28 and, as shown in FIG. 3 of the drawings, this means includes a floating barrier 76 mounted in a bore 77 parallel to the aligned bores 23 and 24 and held in a central position by means of coil compression springs 78 and 79. One end of the bore 77 is connected by passageway 81 to the expansible chamber 26 and the other end of the bore 77 is connected by passageway 82 to the expansible chamber 28. Accordingly, the barrier 76 acts to minimize any difference in pressures in the expansible chambers 26 and 28. However, if failure of the hydraulic lines 13 or hydraulic lines 16 should occur, so that the brake system to one pair of wheel cylinders is rendered inoperative, the brake system to the other pair of wheel cylinders is not adversely affected, because the floating barrier 76 does not permit flow of any considerable quantity of hydraulic fluid from one expansible chamber to the other. Instead, its range of movement is limited and it can travel only to the extent permitted by the springs 78 and 79 until they "go solid."

Conventional fittings 84 are provided for bleeding air from the hydraulic system when it is initially filled with hydraulic fluid.

Having fully described my invention, it is to be understood that I am not to be limited to the details herein set forth but that my invention is of the full scope of the appended claims.

I claim:

1. A dual master-cylinder assembly for hydraulically pressurizing two separate pairs of wheel-cylinder assemblies in a hydraulic brake system for a vehicle, comprising in combination: a housing having two coaxial cylindrical bores therein, a piston slidable in each bore, each piston cooperating with said housing to define an expansible pressure chamber, means on the housing for connecting each of said pressure chambers to one of said pairs of wheel-cylinder assemblies, respectively, an actuator mounted within the housing for lateral movement at right angles to said aligned bores, said actuator having a portion aligned with and extending between said pistons, toggle mechanism including a pair of equal-length links each having one end pivotally mounted on the actuator, means connecting the other end of each link to move one of said pistons, respectively, and two thrust rollers pivoted on each of said links respectively and proximate to said connecting means; each of said thrust rollers being crowned for rolling contact with the surface of one of said cylindrical bores, respectively, to minimize side thrust applied by each link to its respective piston whereby said pistons are caused to move equally in opposite directions, upon lateral movement of said actuator.

2. The combination set forth in claim 1 in which each thrust roller is provided with laterally extending trunnions, the pistons having bifurcated portions having apertures loosely receiving said trunnions.

3. The combination set forth in claim 1 in which said links are pivotally mounted on a single pin on the actuator.

4. The combination set forth in claim 1 in which guide rollers are provided in the housing for guiding contact with the actuator.

5. The combination set forth in claim 1 wherein the housing is formed of separate sections each containing one of said bores, each section also containing guide rollers for the actuator, the sections being connected by a joint in a plane containing the axis of movement of the actuator, and means securing the housing sections together on said joint.

6. A dual master-cylinder assembly for hydraulically pressurizing two separate pairs of wheel-cylinder assemblies in a hydraulic brake system for a vehicle, comprising in combination: a housing having two coaxial cylindrical bores therein, a piston slidable in each bore, each piston cooperating with said housing to define an expansible pressure chamber, means on the housing for connecting each of said pressure chambers to one of said pairs of wheel-cylinder assemblies, respectively, an actuator mounted within the housing for lateral movement at right angles to said aligned bores, said actuator having a portion aligned with and extending between said pistons, toggle mechanism including a pair of equal length links each having one end pivotally mounted on the actuator, means connecting the other end of each link to move one of said pistons, respectively, two thrust rollers pivoted on each of said links respectively and proximate to said connecting means; each of said thrust rollers being crowned for rolling contact with the cylindrical surface of one of said bores, respectively; each of said thrust rollers being provided with laterally extending trunnions, the pistons having bifurcated portions having apertures loosely receiving said trunnions; whereby said pistons are caused to move equally in opposite directions, upon lateral movement of said actuator.

* * * * *